(12) United States Patent
Sadr

(10) Patent No.: US 12,128,740 B2
(45) Date of Patent: Oct. 29, 2024

(54) VEHICLE ACCESSORY APPARATUS WITH INCOMPLETE ASSEMBLY INDICATOR

(71) Applicant: MARKDOM INTERNATIONAL INC., Toronto (CA)

(72) Inventor: Changize Sadr, Toronto (CA)

(73) Assignee: MARKDOM INTERNATIONAL INC., Toronto (CA)

( * ) Notice: Subject to any disclaimer, the term of this patent is extended or adjusted under 35 U.S.C. 154(b) by 46 days.

(21) Appl. No.: 18/079,359

(22) Filed: Dec. 12, 2022

(65) Prior Publication Data

US 2023/0182543 A1 Jun. 15, 2023

Related U.S. Application Data

(60) Provisional application No. 63/288,410, filed on Dec. 10, 2021.

(51) Int. Cl.
- *B60H 1/34* (2006.01)
- *F16B 5/06* (2006.01)

(52) U.S. Cl.
CPC ............. *B60H 1/34* (2013.01); *F16B 5/0664* (2013.01); *B60H 2001/3492* (2013.01)

(58) Field of Classification Search
None
See application file for complete search history.

(56) References Cited

U.S. PATENT DOCUMENTS

| | | |
|---|---|---|
| 2,297,892 A | 10/1942 | Jacobs |
| 3,405,968 A | 10/1968 | Feles et al. |
| 5,105,849 A | 4/1992 | Clough |
| 5,194,038 A | 3/1993 | Klomhaus et al. |
| 5,727,999 A | 3/1998 | Lewis |
| 6,016,802 A | 1/2000 | Jackson |
| 6,026,852 A | 2/2000 | Barton et al. |
| 6,132,308 A | 10/2000 | Dietz et al. |
| 6,210,266 B1 | 4/2001 | Barton |
| 6,299,177 B1 | 10/2001 | Rehberg et al. |
| 7,182,093 B2 | 2/2007 | Call et al. |
| 7,302,962 B2 | 12/2007 | Blake, III et al. |
| 7,503,843 B1 | 3/2009 | Wilmoth |
| 8,616,944 B2 | 12/2013 | Chambo et al. |
| 8,986,086 B2 | 3/2015 | Carlson et al. |
| 9,410,717 B2 | 8/2016 | Marleau et al. |
| 9,592,857 B2 | 3/2017 | Eckstein |
| 9,834,064 B2 | 12/2017 | Wissmueller et al. |
| 10,245,922 B2 | 4/2019 | Huet |
| 2009/0280736 A1 | 11/2009 | Schneider |
| 2013/0095738 A1 | 4/2013 | Marleau et al. |
| 2019/0152296 A1 | 5/2019 | Lefever et al. |
| 2019/0315198 A1 | 10/2019 | Daly et al. |

(Continued)

FOREIGN PATENT DOCUMENTS

| | | |
|---|---|---|
| DE | 102009026222 A1 | 2/2011 |
| EP | 063795 A1 | 11/1982 |

(Continued)

*Primary Examiner* — Alexander S Thomas

(57) ABSTRACT

A vehicle accessory apparatus for mounting in a panel aperture of a vehicle panel includes a housing having an injection molded frame and one or more mounting clips integrally molded with the frame along an outer periphery of the frame. Each mounting clip is biased to an advanced position and resiliently movable to a retracted position upon partial insertion of the housing into the panel aperture of the vehicle panel.

19 Claims, 12 Drawing Sheets

(56) References Cited

U.S. PATENT DOCUMENTS

| | | |
|---|---|---|
| 2020/0062084 A1 | 2/2020 | Porter et al. |
| 2020/0189359 A1 | 6/2020 | Barnes et al. |
| 2020/0263801 A1 | 8/2020 | Sterbenz et al. |

FOREIGN PATENT DOCUMENTS

| | | |
|---|---|---|
| EP | 0915302 A2 | 5/1999 |
| WO | 9836924 A1 | 8/1998 |
| WO | 2017095363 A1 | 6/2017 |

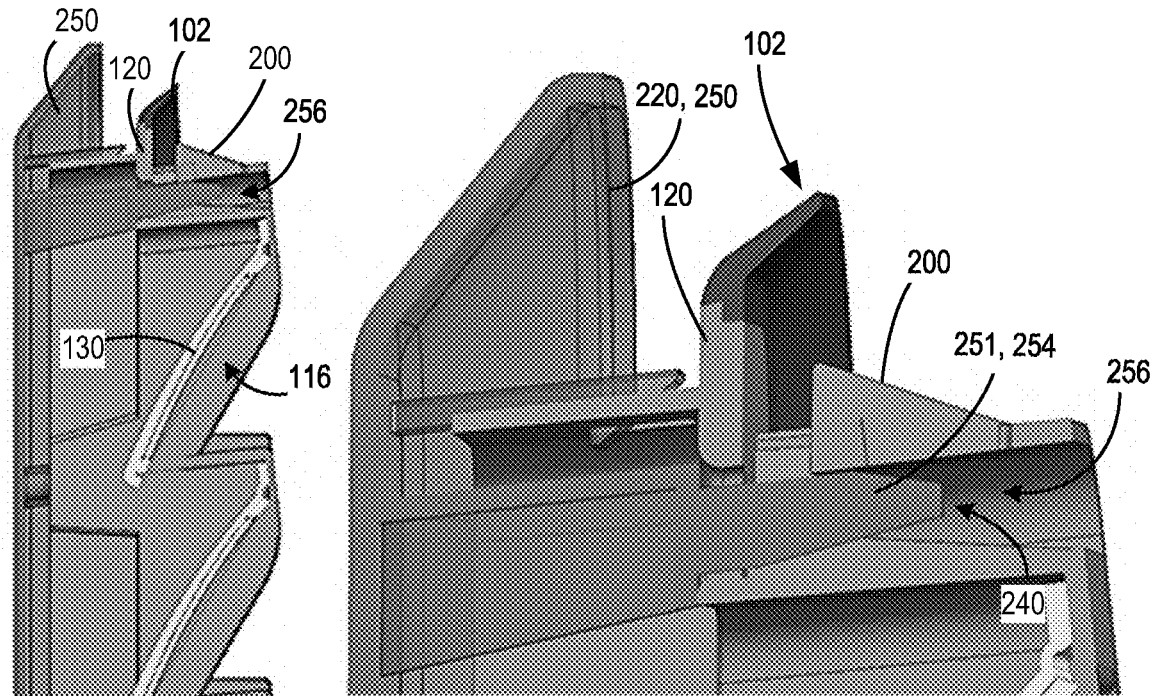
FIG. 12
FIG. 13
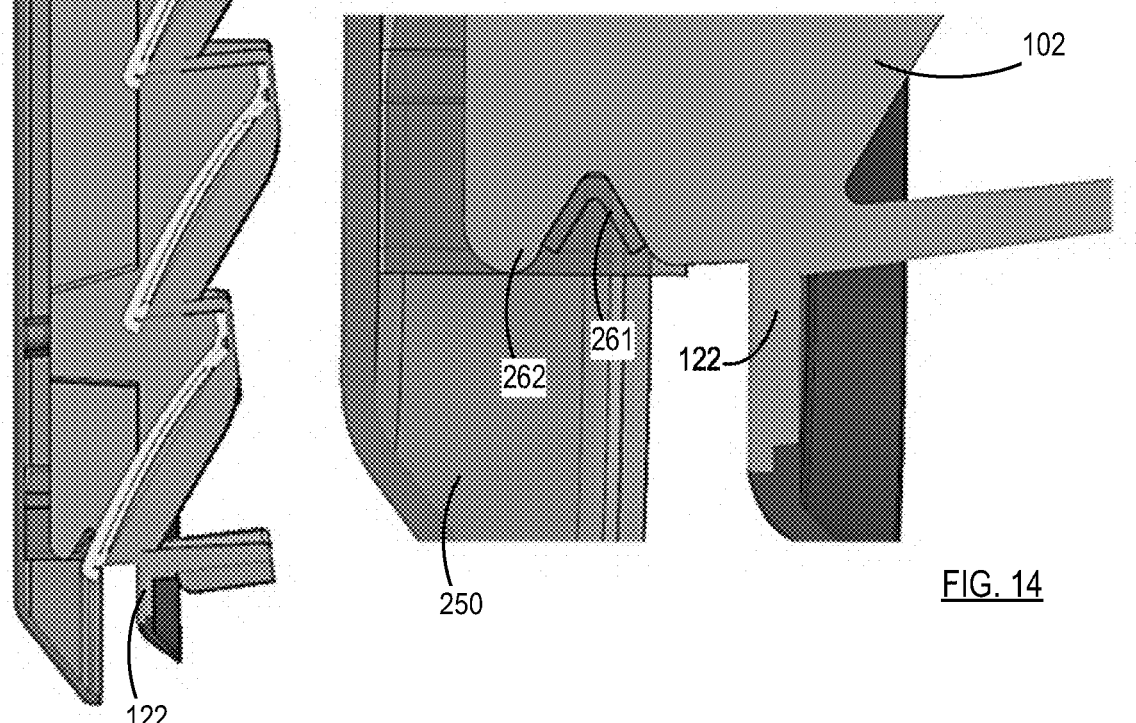
FIG. 14

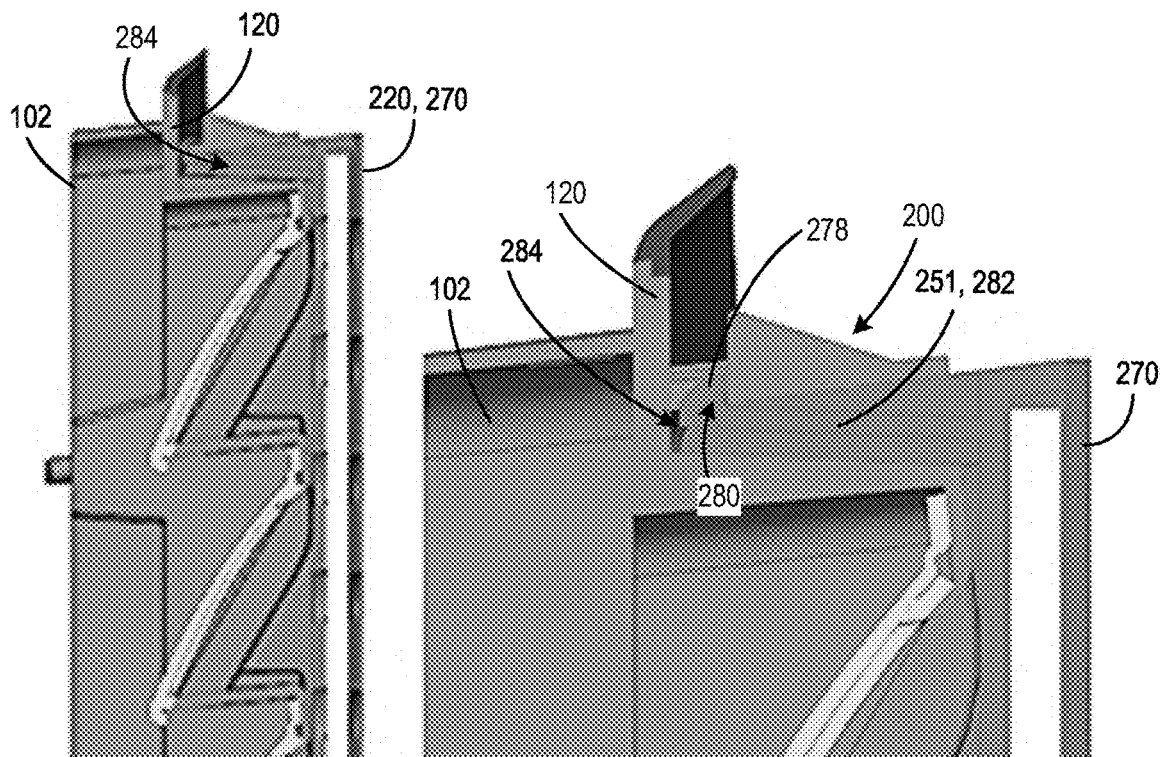
FIG. 18
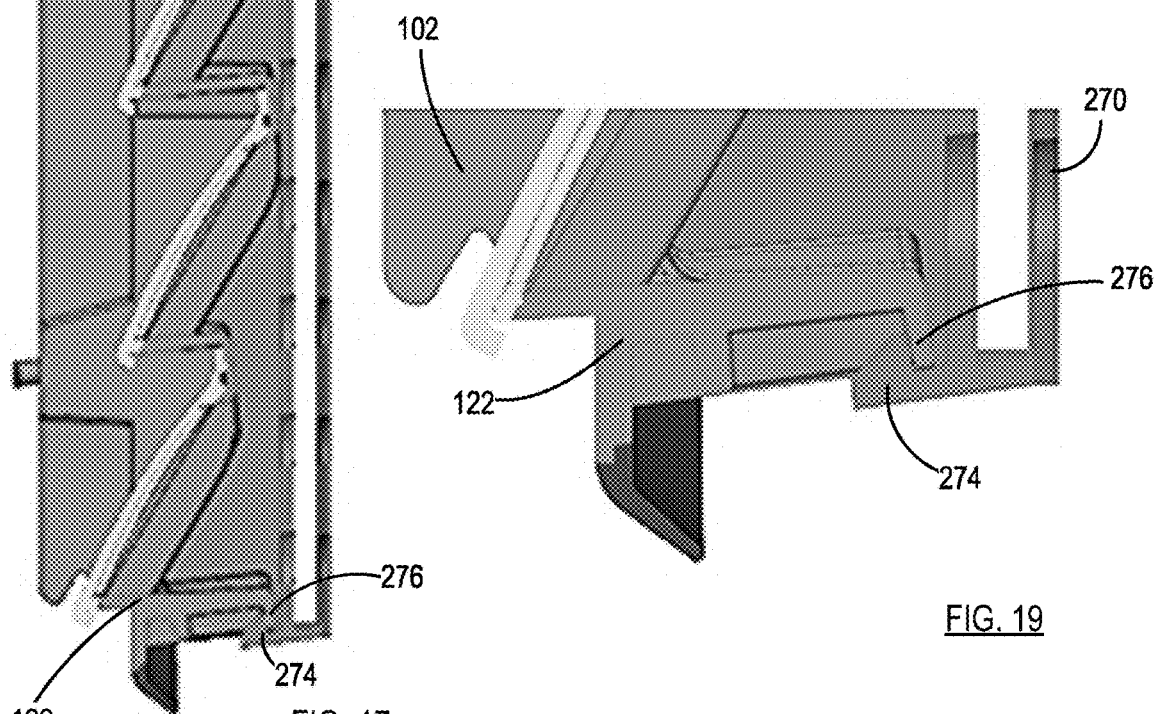
FIG. 19
FIG. 17

VEHICLE ACCESSORY APPARATUS WITH INCOMPLETE ASSEMBLY INDICATOR

CROSS-REFERENCE TO RELATED APPLICATIONS

The present application claims priority from U.S. Provisional Application No. 63/288,410, filed Dec. 10, 2021, which is hereby incorporated herein by reference in its entirety.

FIELD

The present specification relates generally to vehicle accessories, and more specifically, to vehicle accessory apparatuses with indicators for revealing incomplete assembly of parts.

BACKGROUND

U.S. Pat. No. 8,986,086 (Carlson et al.) discloses an insert for an opening in a base, including a housing having a peripheral side wall defining an interior space. The peripheral side wall includes at least one latch member having a latching position. The latch member engages the base to secure the housing in the opening when the latch member is in the latching position. The housing is inserted into the opening in a first direction to engage the latch member with the base. At least one indicator shows when the at least one latch member is in the latching position. The indicator is visible in the first direction when the insert is in the opening in the base.

U.S. Pat. App. Pub. No. 2020/0062084 (Porter et al.) discloses a ventilation module for a vehicle having a housing including a flap hingedly secured along an inner edge to the housing to extend across its open interior. The flap includes side edges and an interconnecting outer edge which contact, in a closed flap condition, support locations configured along the housing to define its open interior. One or more fingers extend from at least one of the side and outer edges of the flap so that the fingers abut standoff locations of the housing located in proximity to the support locations. Upon a sufficient positive air pressure condition created within the passenger compartment which overcomes a holding force exerted by the fingers against said stand-offs, the flap is allowed to open in a controlled fashion to vent to the exterior the excess air pressure, until reclosing upon achieving an air equilibrium condition.

SUMMARY

The following summary is intended to introduce the reader to various aspects of the applicant's teaching, but not to define any invention.

According to some aspects, a vehicle accessory apparatus for mounting in a panel aperture of a vehicle panel includes: (a) a first part having: (i) an injection molded frame, (ii) one or more mounting clips integrally molded with the frame along an outer periphery of the frame, each mounting clip biased to an advanced position, and resiliently movable inwardly to a retracted position upon partial insertion of the first part into the panel aperture of the vehicle panel and back outwardly toward the advanced position upon full insertion of the first part into the panel aperture for retaining the first part in the panel aperture; and (iii) one or more passageways in the frame, each passageway disposed inwardly of a respective clip, and each clip clear of a respective passageway when in the advanced position and occluding the respective passageway when in the retracted position. The accessory apparatus further includes (b) at least one second part mountable to the first part when the first part is fully inserted into the panel aperture. Each second part includes one or more protrusions directed toward the frame. Each protrusion is alignable with a respective passageway for insertion therein when the respective clip is in the advanced position to mount the second part to the first part. Each protrusion inhibits mounting of the second part to the first part through interference with the clip when the clip is in the retracted position, thereby indicating incomplete insertion of the first part into the panel aperture.

In some examples, each second part is mountable in snap-fit engagement with the first part when the one or more mounting clips are in the advanced position, and when the one or more mounting clips are in the retracted position, interference between the one or more protrusions and respective clips inhibits the snap-fit engagement between the first and second parts.

In some examples, the first part comprises at least one first snap-fit connector on the frame, and the second part comprises at least one second snap-fit connector directed towards and aligned with a respective first snap-fit connector for the snap-fit engagement between the first and second parts. In some examples, each protrusion of the second part comprises a respective second snap-fit connector. In some examples, the first snap-fit connector comprises a pocket adjacent a respective clip for receiving the second snap-fit connector when the protrusion is inserted into a respective passageway with the clip in the advanced position, and wherein the pocket is blocked from receiving the second snap-fit connector when the mounting clip is in the retracted position.

In some examples, each passageway extends along a passageway axis, each protrusion extends generally parallel with the passageway axis when in alignment with the passageway, and each clip is movable generally perpendicular to the passageway axis between the retracted and advanced positions.

In some examples, the first part has an exterior face and an interior face opposite the exterior face, and each passageway extends through the first part between an exterior end open to the exterior face and an interior end open to the interior face. In some examples, the at least one second part comprises a pair of second parts including one second part mountable over the exterior face of the first part with the at least one protrusion of the second part insertable into the passageway through the exterior end, and another second part mountable over the interior face of the first part with the at least one protrusion of the another second part insertable into the passageway through the interior end.

In some examples, the first part includes an abutment surface for bearing against a front marginal surface of the vehicle panel adjacent the panel aperture when the first part is fully inserted therein, and each clip includes a catch surface directed toward the abutment surface for bearing against a rear marginal surface of the vehicle panel opposite the front marginal surface when the clip is in the advanced position to retain the housing when fully inserted in the panel aperture.

In some examples, the abutment surface comprises an engagement surface of an outer peripheral seal extending about the outer periphery of the frame, the seal resiliently compressible against the front marginal surface when the housing is partially inserted into the panel aperture and the one or more clips are urged to the retracted position, and the seal remaining compressed to exert a sealing force against the vehicle panel when the one or more clips are in the advanced position for retaining the housing when fully inserted.

In some examples, the frame is generally rectangular and has four frame edges including a horizontal first frame edge, a horizontal second frame edge opposite the horizontal first frame edge, a vertical third frame edge extending between the first and second frame edges, and a vertical fourth frame edge opposite the third frame edge and extending between the first and second frame edges, and wherein the one or more mounting clips are along one of the four frame edges. In some examples, the frame includes a fixed slot in another one of the four frame edges opposite the one or more mounting clips, the fixed slot for receiving a marginal portion of the vehicle panel at an edge of the panel aperture.

In some examples, each clip is pivotable about a clip living hinge for movement between the advanced and the retracted positions. In some examples, the frame has an exterior face directed away from the panel aperture, an interior face opposite the interior face, and at least one flow opening extending between the exterior face and the interior face. In some examples, the first part further includes at least one injection molded flap joined to the frame adjacent an upper edge of a respective flow opening, each flap pivotable between a closed position in which the flap seals the respective flow opening, and an open position in which the flow opening is unblocked for permitting pressurized air at the interior face of the frame to vent through the respective flow opening. In some examples, the at least one second part comprises a cover mountable over the exterior face of the frame. In some examples, the at least one second part comprises a filter casing mountable over the interior face of the frame for holding a filter across the at least one flow opening.

According to some aspects, a vehicle accessory apparatus for mounting in a panel aperture of a vehicle panel includes a first part insertable into the panel aperture in an insertion direction. The first part includes: (i) an injection molded frame, (ii) one or more mounting clips integrally molded with the frame along an outer periphery of the frame, each mounting clip biased to an advanced position and resiliently movable inwardly generally perpendicular to the insertion direction to a retracted position upon partial insertion of the first part into the panel aperture of the vehicle panel, and each mounting clip urged back outwardly toward the advanced position upon full insertion of the first part into the panel aperture for retaining the first part in the panel aperture; and (iii) one or more passageways in the frame for receiving respective protrusions of a second part mountable to the first part when the first part is fully inserted into the panel aperture, each passageway extending along a passageway axis generally parallel with the insertion direction and disposed inwardly of and adjacent a respective clip. Each clip is clear of a respective passageway when in the advanced position to permit full insertion of a respective protrusion in the passageway for mounting the second part to the first part, and each clip occludes the respective passageway when in the retracted position to inhibit full insertion of the respective protrusion into the passageway, thereby indicating incomplete insertion of the first part into the panel aperture.

According to some aspects, a vehicle accessory apparatus for mounting in a panel aperture of a vehicle panel including: (a) a first part mountable in the panel aperture, the first part including a frame and at least one interference member attached to the frame, the interference member biased toward a first position, resiliently movable into a second position when the first part is partially inserted into the panel aperture, and returning back toward the first position when the first part is fully inserted into the panel aperture; and (b) at least one second part mountable to the first part when the first part is fully inserted into the panel aperture with the interference member in the first position, and when the interference member is in the second position, the interference member is positioned to interfere with mounting of the second part to the first part, thereby indicating incomplete insertion of the first part into the panel aperture.

In some examples, the frame has a respective channel adjacent each interference member, the interference member clear of the channel when in the first position and occluding the channel when in the second position, and wherein each second part includes a respective protrusion insertable into each channel when the interference member is in the first position to mount the second part to the first part, and the protrusion inhibiting mounting of the second part to the first part through interference with the interference member when the interference member is in the second position.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 12 is a cross-sectional view of the accessory apparatus of FIG. 1 with the cover mounted;

FIG. 13 is an enlarged view of an upper portion of the cross-sectional view of FIG. 12;

FIG. 14 is an enlarged view of a lower portion of the cross-sectional view of FIG. 12;

FIG. 17 is a cross-sectional view of the accessory apparatus of FIG. 1 with the filter casing mounted;

FIG. 18 is an enlarged view of an upper portion of the cross-sectional view of FIG. 17;

FIG. 19 is an enlarged view of a lower portion of the cross-sectional view of FIG. 17;

DETAILED DESCRIPTION

Various articles, apparatuses, or processes will be described below to provide an example of an embodiment of each claimed invention. No embodiment described below limits any claimed invention and any claimed invention may cover articles, processes, or apparatuses that differ from those described below. The claimed inventions are not limited to articles, apparatuses, or processes having all of the features of any one article, apparatus, or process described below or to features common to multiple or all of the articles, apparatuses, or processes described below. It is possible that an article, apparatus, or process described below is not an embodiment of any claimed invention. Any invention disclosed in an article, apparatus, or process described herein that is not claimed in this document may be the subject matter of another protective instrument, for example, a continuing patent application, and the applicants, inventors, or owners do not intend to abandon, disclaim, or dedicate to the public any such invention by its disclosure in this document.

Vehicle accessories can include, for example, pressure relief valves having one or more openings covered by respective flaps. The flaps are movable to uncover the openings for allowing allow pressurized air in the vehicle compartment to vent to atmosphere through the openings. This can help relieve unwanted pressure build-up inside the vehicle compartment caused by, for example, delivery of air into the compartment by the vehicle's HVAC system, or the fast closure of doors or deck lids. When the flap is in the closed position, the opening is covered by the flap to inhibit reverse flow through the opening. This can prevent unwanted entry of external air or moisture into the vehicle compartment. For these and other types of vehicle accessories, it is important from a cost and quality control perspective to ensure proper assembly (e.g. full insertion) of the accessory in a panel aperture of the vehicle. For example, an otherwise incomplete (partial) insertion of a pressure relief valve accessory can result in an inadequate seal around the panel aperture, resulting in leakage of fluids (e.g. water or fumes) from the outside environment into the vehicle interior.

In some aspects, the present disclosure provides solutions that address shortcomings in existing vehicle accessory designs. According to some aspects, an accessory apparatus is disclosed with an indicator for revealing incomplete assembly of the accessory into a panel aperture of a vehicle, for example, by inhibiting the mounting of a second part of the accessory to a first part if the first part is only partially inserted into the vehicle aperture.

Figure 1:
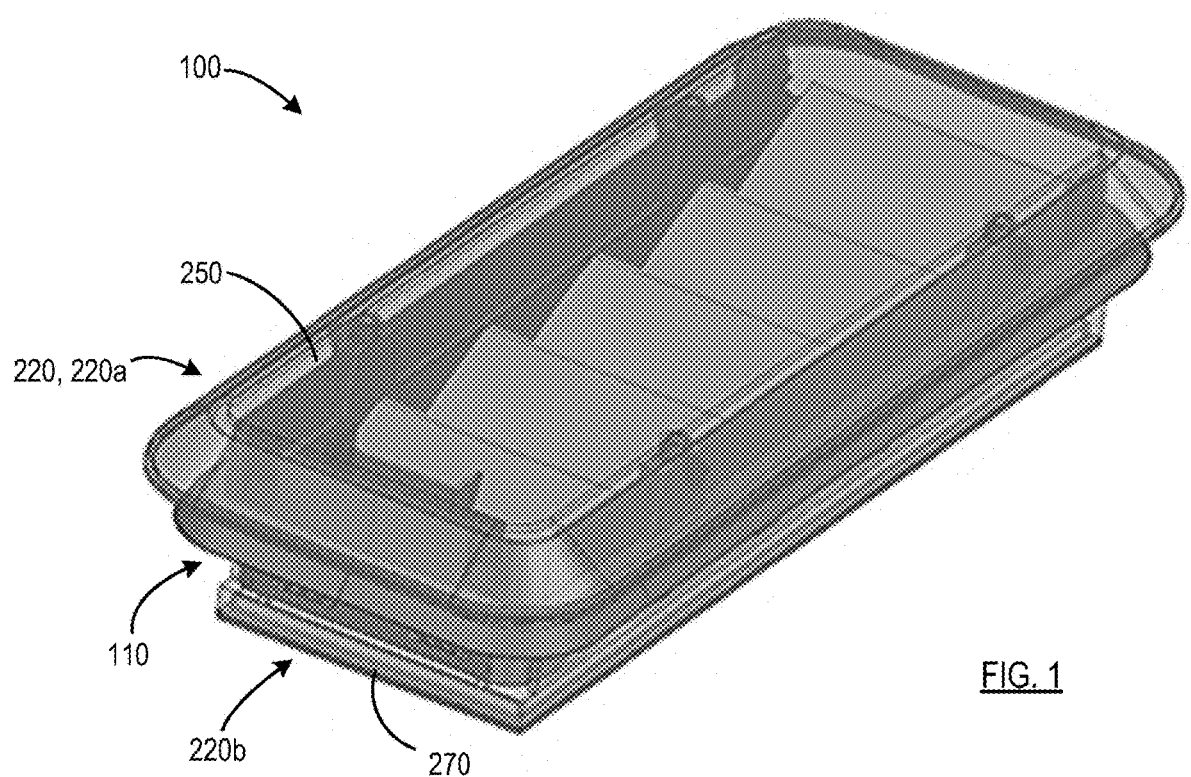
FIG. 1 is a perspective view of an example vehicle accessory apparatus.

Referring to FIG. 1, an example vehicle accessory apparatus 100 for mounting in a panel aperture 104 (FIG. 2) of a vehicle body panel 106 (FIG. 2) is shown. In the example illustrated, the accessory apparatus 100 is formed of multiple parts assembled together, including a first part 110 mountable in the panel aperture 104, and at least one second part 220 mountable to the first part 110 when the first part 110 is mounted in the panel aperture 104. In the example illustrated, the accessory apparatus 100 includes a plurality of second parts 220, including one second part 220a mountable over a first (exterior) face of the first part 110, and another second part 220b mountable over a second (interior) face of the first part 110, the second face opposite the first face.

Figure 2:
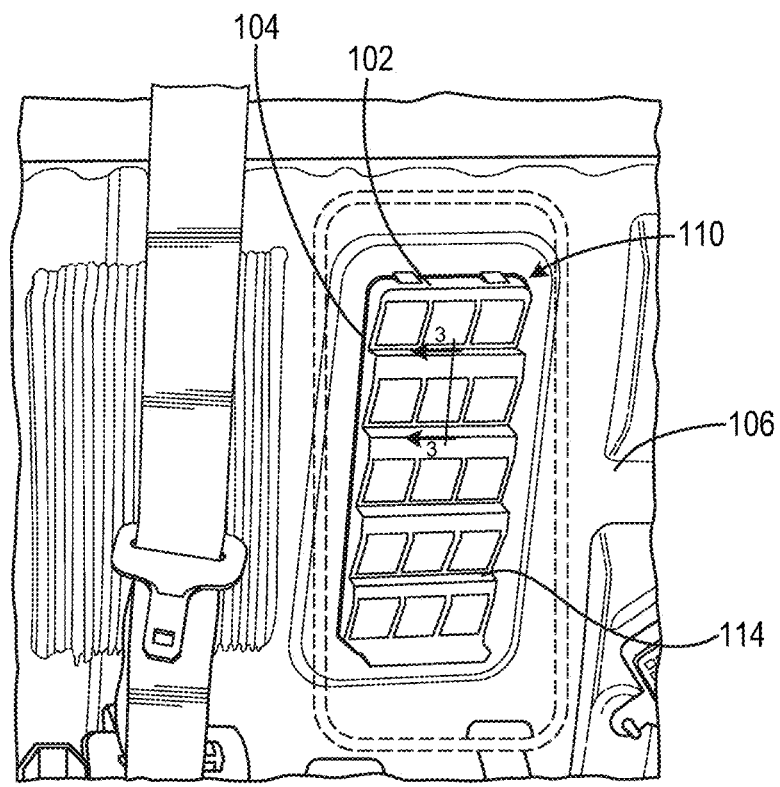
FIG. 2 is a rear (interior) perspective view of an example first part of the apparatus of FIG. 1 mounted in a vehicle panel and viewed from the interior of a vehicle compartment.

Referring to FIG. 2, in the example illustrated, the first part 110 is shown mounted in the panel aperture 104, prior to installation of the second parts 220. In the example illustrated, the first part 110 is in the form of a pressure relief valve apparatus for venting air from a vehicle compartment. The pressure relief valve apparatus includes a housing 102 for mounting in the panel aperture 104 of the vehicle panel 106. In the example illustrated, the vehicle panel 106 is located behind the rear seat of the vehicle, with the pressure relief valve apparatus mounted in the vehicle panel 106 for venting pressurized air from inside the cabin to the external environment.

Figure 3:
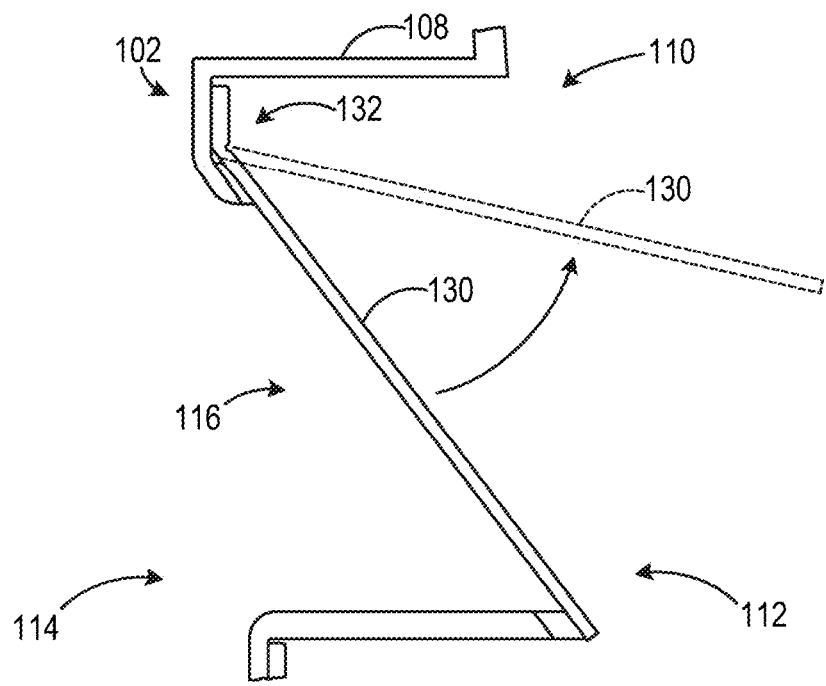
FIG. 3 is a schematic cross-sectional view of a portion of the first part of FIG. 2, taken along lines 3-3 of FIG. 2.

In the example illustrated, the housing 102 is of one-piece construction, formed by injection molding. Injection molding the housing 102 may be performed in a single shot process or a multi-shot process. Referring to FIG. 3, in the example illustrated, the housing 102 includes an injection molded frame 108 having an exterior face 112, an interior face 114 opposite the exterior face 112, and at least one flow opening 116 extending between the exterior face 112 and the interior face 114. In the example illustrated, the frame 108 has a plurality of flow openings 116 extending between the exterior face 112 and the interior face 114. The flow openings 116 are separated from one another by horizontal rails extending between opposed peripheral portions of the frame 108. In the example illustrated, the interior face 114 is configured to be exposed to an internal environment inside the vehicle compartment, and the exterior face 112 is configured to be exposed to an external environment outside the vehicle compartment.

In the example illustrated, the pressure relief valve apparatus has one or more injection molded flaps 130, each flap 130 for blocking and unblocking a respective flow opening 116. In the example illustrated, the valve apparatus has a plurality of injection molded flaps 130 equal in quantity to the plurality of flow openings 116. In the example illustrated, the pressure relief valve apparatus has five flaps 130, one for each flow opening 116. In the example illustrated, each flap 130 has a flap connection portion 132 joined to the frame 108 adjacent an upper edge of a respective flow opening 116. Each flap 130 is pivotable between a closed position (shown in solid line in FIG. 3) in which the respective flow opening 116 is blocked by the flap 130, and an open position (shown in dashed line in FIG. 3) in which the respective flow opening 116 is unblocked for permitting pressurized air at the interior face 114 of the housing 102 to vent to the exterior face 112 through the flow opening 116.

In the example illustrated, the frame 108 is formed of a first polymer material. The first polymer material is sufficiently rigid to provide structural (dimensional) stability to the housing. In the example illustrated, the flaps 130 are formed of a second polymer material that is softer than the first polymer material. The second polymer material is resiliently flexible to facilitate sealing of the flaps with adjacent surfaces when in the closed position.

Figures 4, 5:
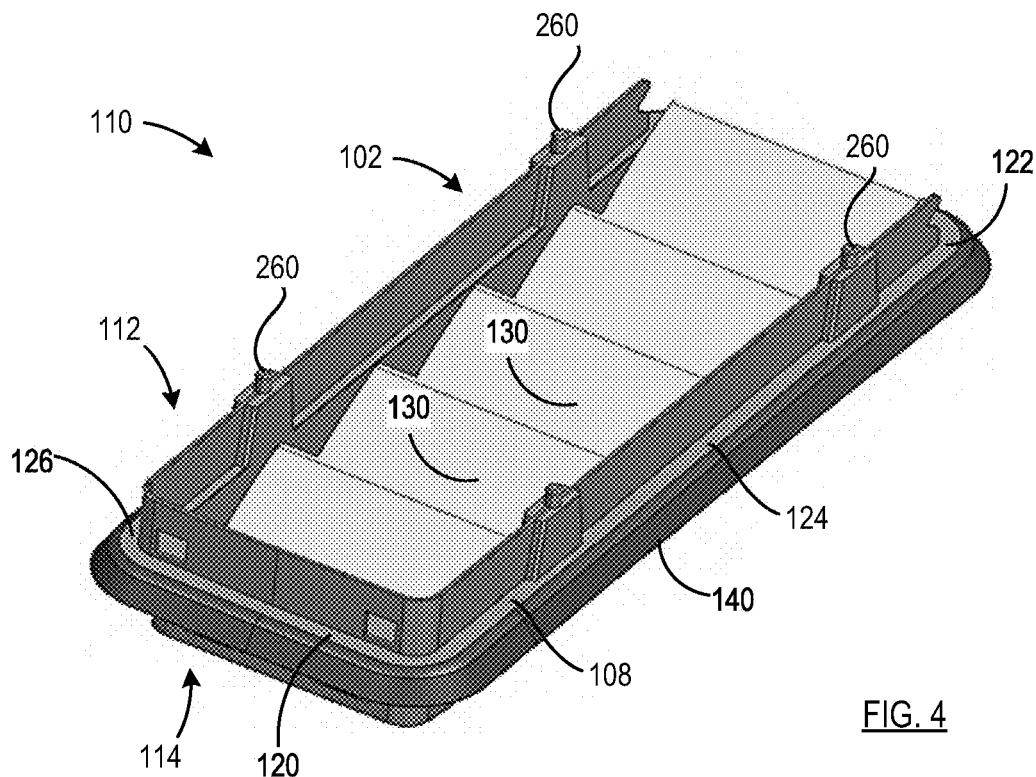
FIG. 4 is a perspective view from an exterior side of the first part of the accessory apparatus of FIG. 1.
FIG. 5 is an enlarged view from an interior side of a portion of the accessory apparatus of FIG. 1.

Referring to FIGS. 4 and 5, in the example illustrated, the housing 102 includes an outer peripheral seal 140 for bearing against the vehicle panel 106 around the panel aperture 104. The peripheral seal 140 can help seal any gaps between the frame 108 and the vehicle panel 106 that may otherwise permit undesired external air, liquid, or noise to enter the interior compartment. The peripheral seal 140 can be formed of a softer, more resiliently flexible material than the material of which the frame 108 is formed. In some examples, the outer peripheral seal 140 can be formed of the same material from which the flaps 130 are formed (i.e. the second polymer material).

In the example illustrated, the frame 108 is generally rectangular and has four frame edges including a horizontal first frame edge, a horizontal second frame edge opposite the first frame edge, a vertical third frame edge extending between the first and second frame edges, and a vertical fourth frame edge opposite the third frame edge and extending between the first and second frame edges. In the example illustrated, the frame 108 has an upper frame member 120 defining the first frame edge and a lower frame member 122 defining the second frame edge. The lower frame member 122 is spaced vertically below the upper frame member 120. Each of the upper and lower frame members 120, 122 extend horizontally between a frame first side member 124 defining the third frame edge and a frame second side member 126 defining the frame fourth edge.

Referring now to FIG. 5, in the example illustrated, the first part 110 includes at least one mounting clip 200 to help retain the first part 100 in the panel aperture 104 when installed. In the example illustrated, the first part 110 includes a plurality of mounting clips 200 (two mounting clips 200, in the example illustrated). The mounting clips 200 are formed on the frame 108 along an outer periphery of the frame 108. In the example illustrated, the mounting clips 200 are integrally molded with the frame 108. In the example illustrated, the mounting clips 200 are formed of the same material as the frame 108, and are optionally formed in the same shot of an injection molding process as the frame 108.

Referring to FIGS. 4 and 5, in the example illustrated, the exterior face 112 of the housing 102 is directed away from the vehicle panel, opposite the direction of insertion (shown at arrow 206 in FIG. 6) of the housing 102 into the vehicle aperture. In the example illustrated, the mounting clips 200 are formed on the interior side (defining the interior face 114) of the housing 102 to engage an inner surface of the vehicle panel 106 to retain the first part 110 in the panel aperture 106.

Figure 6:
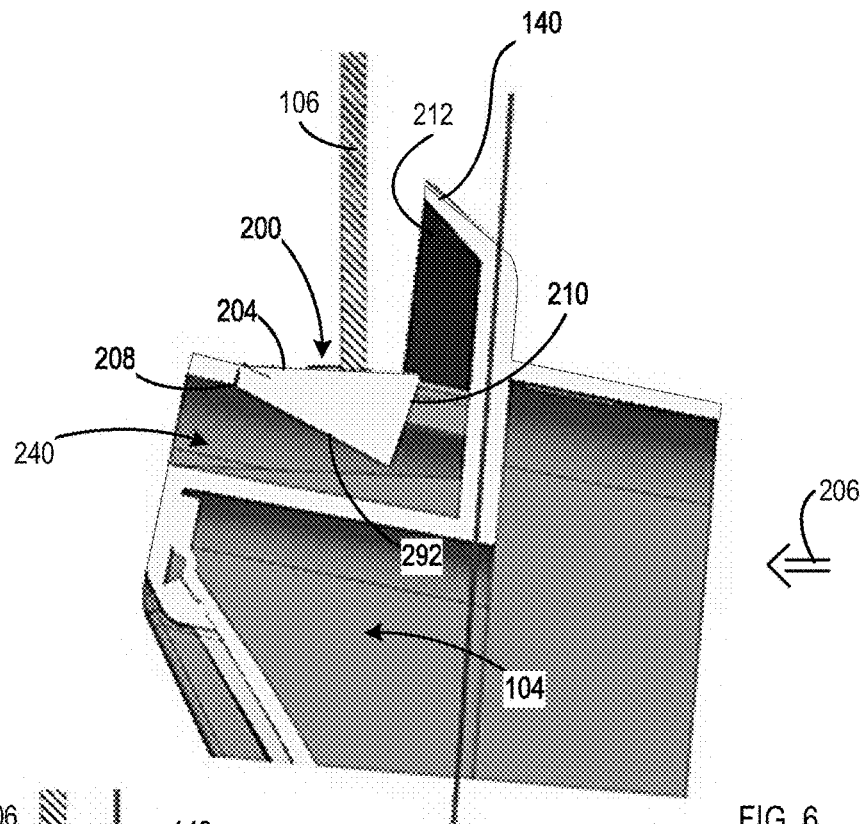
FIG. 6 is a cross-sectional view of an upper portion of the first part of FIG. 2, showing the first part being installed with a clip portion of the first part in a retracted position.
Figure 7:
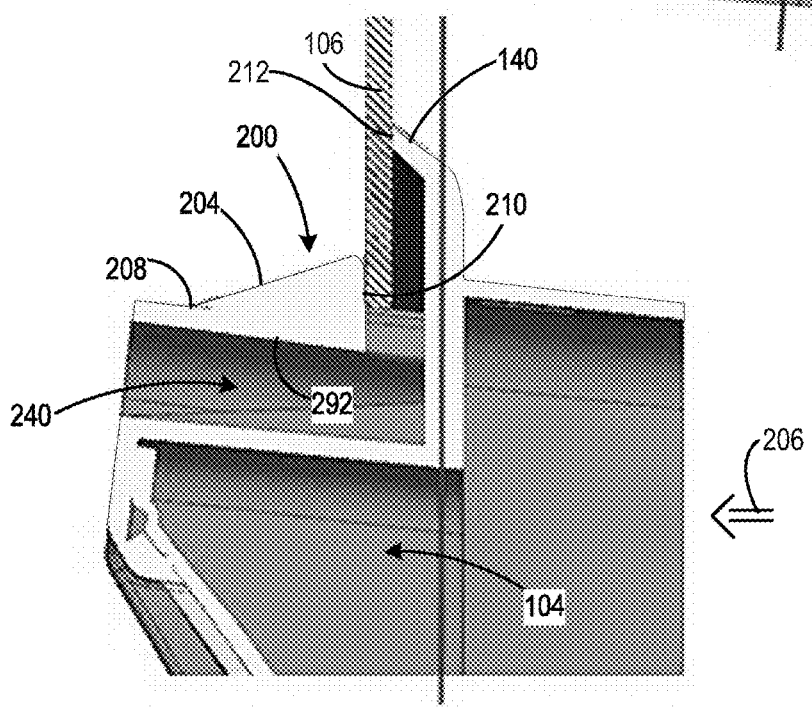
FIG. 7 is a cross-sectional view similar to that of FIG. 6, but showing the first part installed with the clip portion in an advanced position.

Referring to FIGS. 6 and 7, the mounting clips 200 are biased to an advanced position (FIG. 7) and resiliently moveable inwardly to a retracted position (FIG. 6) upon partial insertion of the housing 102 into the panel aperture 104 of the vehicle panel 106. In the example illustrated, each clip 200 is pivotable about a living hinge 208 for movement between the advanced and retracted positions.

Referring to FIG. 7, as the housing 102 is inserted into the panel aperture 104, each mounting clip 200 is deflected by the vehicle panel and urged inwardly toward the retracted position to accommodate insertion of the first part 110 through the panel aperture 104. In the example illustrated, each mounting clip 200 has a ramp surface 204 for engaging an inner edge (lower edge in FIG. 6) of the vehicle panel 106 defining the panel aperture 104 to facilitate deflection of the mounting clip 200 toward the retracted position. After passing through the panel aperture 104, each mounting clip 200 moves outwardly back toward the advanced position and extends laterally outboard of the panel aperture 104 for retaining the first part 110 in the panel aperture. In the example illustrated, each clip 200 has a catch surface 210 positioned for bearing against a rear (interior) marginal surface of the vehicle panel adjacent the panel aperture 104 when the clip 200 is in the advanced position, to inhibit removal of the first part 110 from the panel aperture after being fully inserted. In the example illustrated, each clip 200 is attached to the frame 108 through the living hinge 208, and extends away from the living hinge 208 to a distal end opposite the living hinge 208 and defining the catch surface 210. In the example illustrated, the ramp surface 204 extends between the living hinge 208 and the distal end of the clip 200.

Referring to FIG. 7, in the example illustrated, the housing 102 has an abutment surface 212 adjacent the outer periphery of the housing 102 for bearing against a front (exterior) marginal surface of the vehicle panel 106 opposite the rear (interior) marginal surface against which the catch surface 210 bears. When the first part is inserted into the panel aperture 104 with the clips 200 in the advanced position, the catch surface 210 is directed toward and spaced apart from the abutment surface 212. The abutment surface 212 and the catch surfaces 210 cooperate to retain a portion of the panel therebetween to inhibit removal of the first part 110 from the panel aperture 104 after being fully inserted therein with the mounting clips 200 in the advanced position.

In the example illustrated, the abutment surface 212 comprises an engagement surface of the outer peripheral seal 140 directed toward the exterior marginal surface upon installation of the housing 102 into the aperture 104. The seal 140 is resiliently compressible when the housing 102 is inserted into the aperture 104 and the clips 200 are urged to the retracted position. The seal 140 remains compressed to exert a sealing force against the exterior surface of the vehicle panel 106 when the clips 200 are in the advanced position for holding the housing 102 in the fully inserted position.

Referring to FIG. 5, in the example illustrated, the plurality of mounting clips 200 are provided along the same frame member (and frame edge) of the frame 108. In the example illustrated, the mounting clips 200 are provided along the upper frame member 120 (defining the first frame edge).

Figure 8:
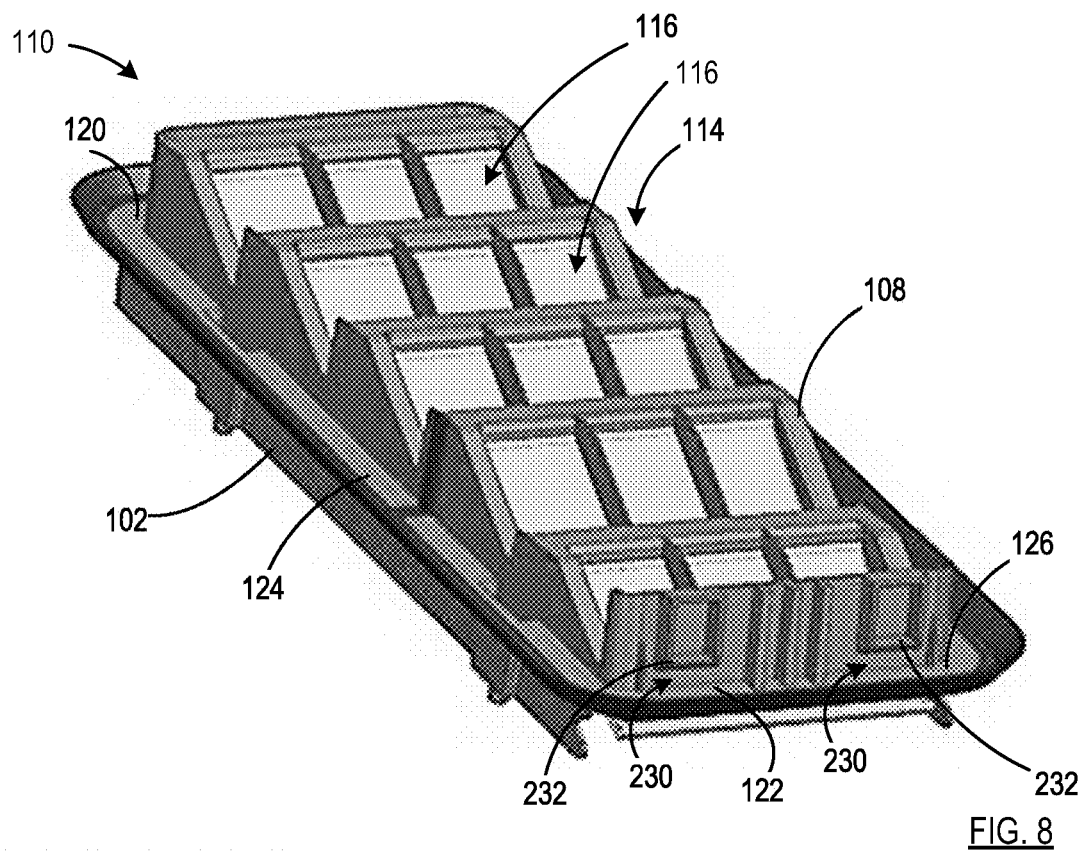
FIG. 8 is a perspective view from the interior side of the first part of the accessory apparatus of FIG. 1.
Figure 9:
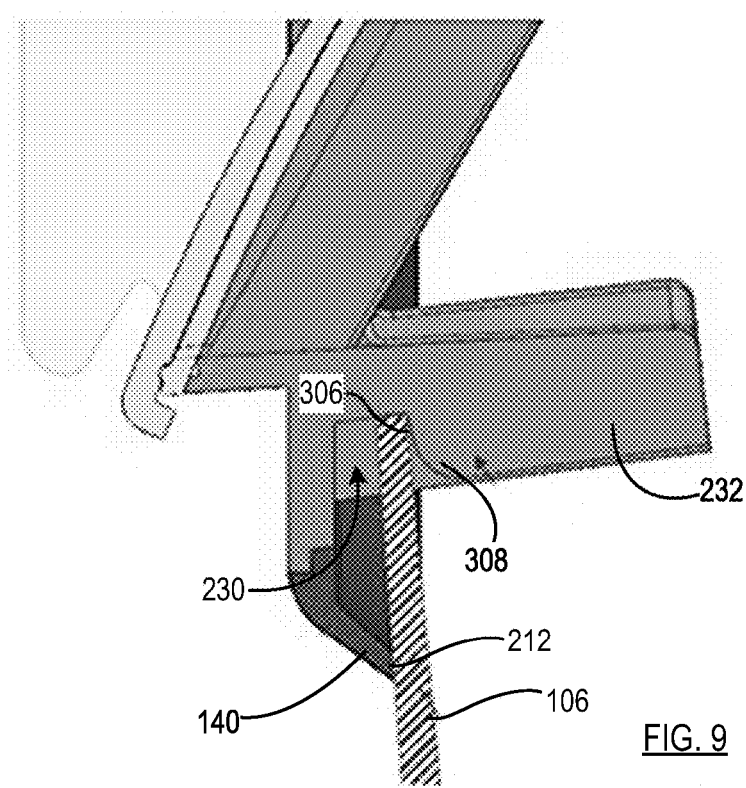
FIG. 9 is a cross-sectional view of a lower portion of the installed first part of FIG. 2, showing a mounting slot portion of the first part.

Referring to FIGS. 8 and 9, in the example illustrated, the frame 108 includes at least one slot 230 fixed relative to the frame 108 for receiving a marginal portion of the vehicle panel 106 therein at an edge of the panel aperture 104 to facilitate retention of the first part 110 in the panel aperture 104. In the example illustrated, two slots 230 are provided in the frame 108. In the example illustrated, each slot 230 is on the same (interior) side of the housing 102 as the clips 200, and is in the frame member (and along the corresponding edge) opposite that of the mounting clips 200. In the example illustrated, the slots 230 are in the lower frame member 122 (defining the second frame edge).

In the example illustrated, the fixed slots 230 are between the abutment surface 212 and a seat surface 306 of the frame 108. When the housing 102 is inserted into the aperture 104, the housing 102 is placed with the marginal surface of the vehicle panel 106 received in the slots 230 before pivoting the opposite end of the housing 102 into the aperture 104 for engaging the mounting clips 200. The seal 140 remains compressed against the exterior surface of the vehicle panel 106 adjacent the aperture 104 to exert a sealing force against the exterior surface of the vehicle panel 106 that holds the seat surface 306 against the vehicle panel 106. The example seat surface 306 includes a shoulder 308 of a locking feature 232. The fixed slot 230 extends between the locking feature 232 and the abutment surface 212.

In the example illustrated, the clips 200 serve both to facilitate retention of the first part in the panel aperture 104 when fully inserted therein, and as interference structures acting as indicators for revealing incomplete assembly (e.g. partial insertion) of the first part 110 into the panel aperture 104. Referring to FIGS. 6 and 7, in the example illustrated, the frame 108 includes a respective passageway 240 (also referred to as channel 240) disposed inwardly of and adjacent to each clip 200. In the example illustrated, each clip 200 is clear of a respective passageway 240 when the clip 200 is in the advanced position (FIG. 7), and occludes the passageway 240 when the clip 200 is in the retracted position (FIG. 6) to help reveal incomplete insertion of the first part 110 into the panel aperture 104.

Referring to FIG. 13, in the example illustrated, each second part 220 is mountable to the first part 110 after the first part 110 is fully inserted into the panel aperture 104 (with the mounting clips 200 in the advanced position). In the example illustrated, each second part 220 includes at least one protrusion 251 alignable with a respective passageway 240 for insertion therein when the respective clip 200 is in the advanced position to mount the second part 220 to the first part 110. When the clip 200 is in the retracted position, the clip 200 occludes the passageway 240 and obstructs full insertion of the protrusion 251 into the passageway 240. The clip 200 and protrusion 251 thereby cooperate to inhibit mounting (e.g. snap-fit engagement) of the second part 220 to the first part 110 through interference between the protrusion and the clip 200 in the retracted position, thereby indicating incomplete installation of the first part 110 into the panel aperture 104.

In the example illustrated, each passageway 240 extends along a passageway axis, and each protrusion 251 extends generally parallel with the passageway axis when in alignment with the protrusion 251 for insertion therein. Each clip 200 is movable generally perpendicular to the passageway axis between the retracted and advanced positions.

The passageway 240 can have at least one open end that opens to the interior face 114 or the exterior face 112 of the housing 102 and through which the protrusion 251 of a respective second part 220 is insertable into the passageway 240. In the example illustrated, each passageway 240 is adapted to receive respective protrusions from two second parts simultaneously. In the example illustrated, each passageway 240 extends through the housing 102 between an exterior end open to the exterior face 112 and an interior end open to the interior face 114. In the example illustrated, one of the second parts 220 (e.g. cover 250 shown in FIG. 13) is mountable to the first part 110 over the exterior face 112 with the protrusions 251 of the second part 220 insertable into respective passageways through the exterior end of each passageway 240. The other second part 220 (e.g. filter casing 270 shown in FIG. 17) is mountable to the first part 110 over the interior face 114 of the first part 110 with the protrusions 251 of the other second part 220 insertable into respective passageways 240 through the interior end. When in the retracted position, one mounting clip 200 obstructs insertion of the protrusions of both the second parts 220 into the respective passageway 240 occluded by the one mounting clip 200.

Figure 10:
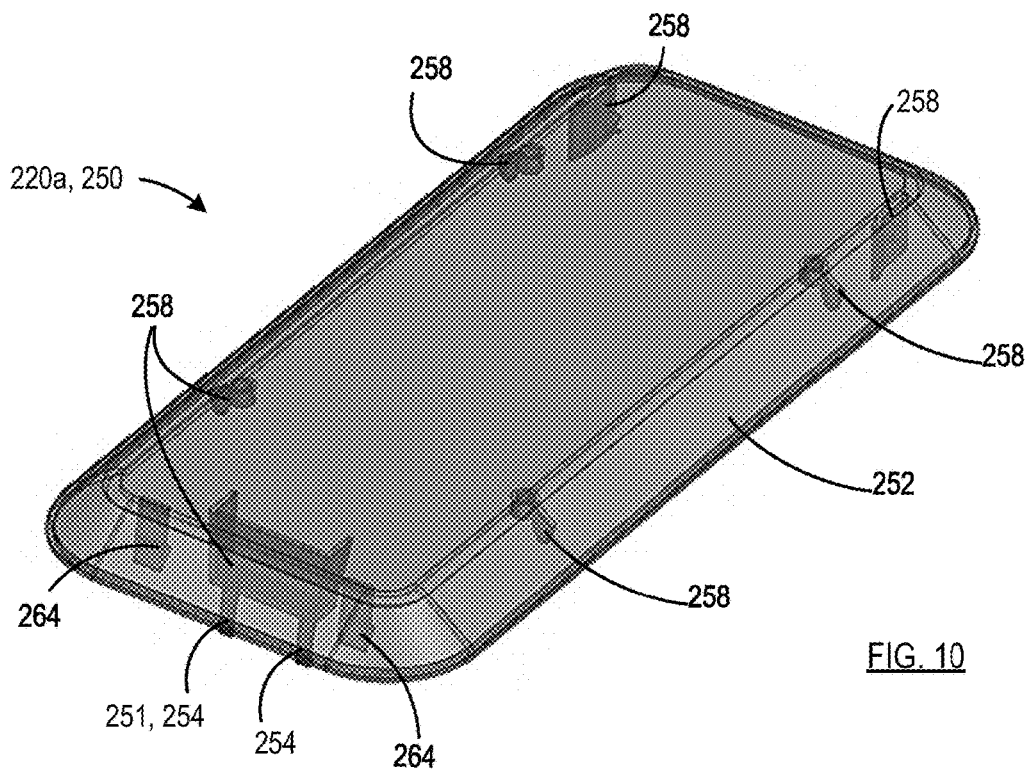
FIG. 10 is a perspective view of an example second part in the form of a cover of the accessory apparatus of FIG. 1.
Figure 11:
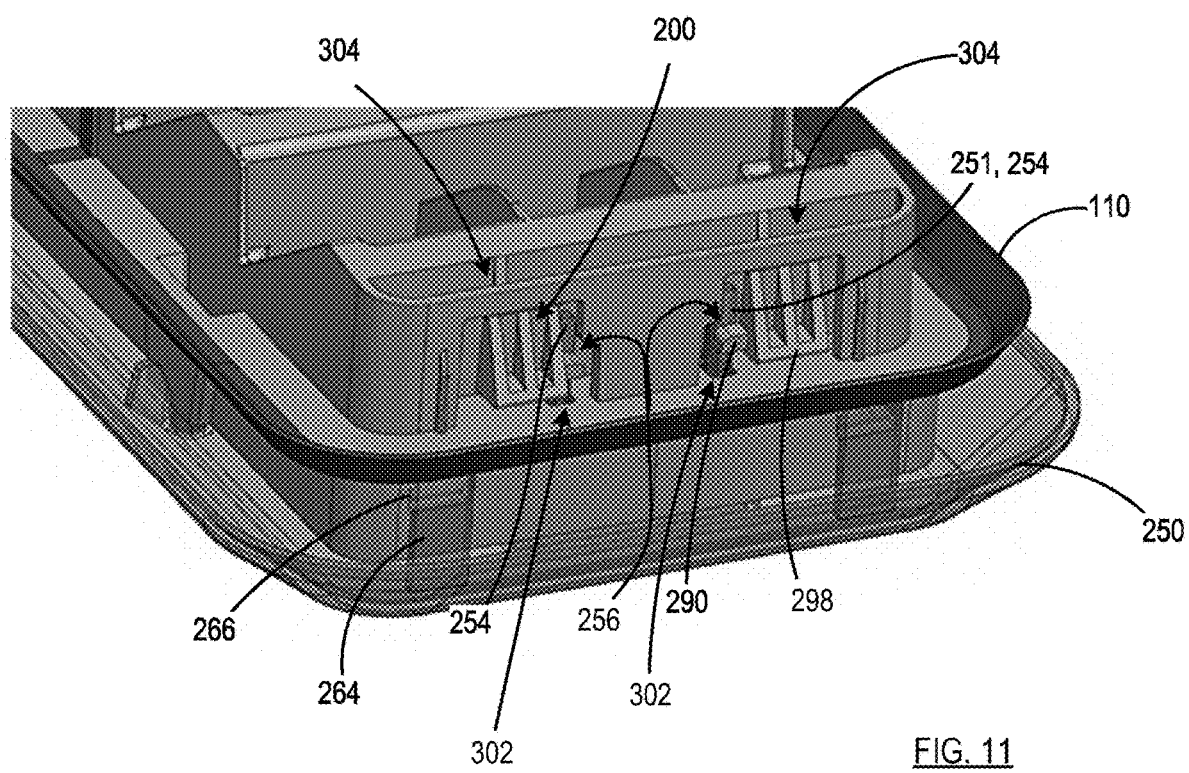
FIG. 11 is an enlarged view from the interior side of a portion of the accessory apparatus of FIG. 1 with the cover mounted.

Referring to FIGS. 10 and 11, one of the second parts 220a comprises a cover 250 mountable over the exterior face 112 of the first part 110 to cover the flaps 130. In the example illustrated, the cover 250 includes a substantially continuous outer shell 252 and at least one standoff connector 258 to hold the outer shell 252 away from the exterior face 112 of the housing 102 (e.g. to permit opening of the flaps 130 and venting of air). The example cover 250 includes a plurality of standoff connectors 258 distributed about a periphery of the shell 252 to hold the periphery of the shell 252 away from the exterior face 112 of the housing 102. The cover standoff connectors 258 are arranged to engage housing standoff connectors 260 (FIG. 4).

The cover 250 includes one or more cover fasteners to hold the cover 250 to the housing 102. As shown in FIG. 14, the cover fasteners include cover detent connectors 261 for engagement with corresponding housing detent connectors 262 of the housing 102. As shown in FIG. 11, the cover fasteners further include cover snap-fit connectors 264 for engagement with corresponding housing snap-fit connectors 266 (e.g. pockets) of the housing 102. In the example illustrated, the housing snap-fit connectors 266 are on the upper frame member 120 and the housing detent connectors 262 are adjacent the lower frame member 122.

In the example illustrated, the protrusions 251 of the cover 250 comprise a plurality of cover protrusions 254 directed towards the exterior face 112 of the frame 108. Each cover protrusion 254 is shaped to be received in a respective passageway 240 through the open exterior end of the passageway 240. In the example illustrated, the cover protrusions 254 project toward the frame from one of the standoffs 258.

Referring to FIG. 11, in the example illustrated, each clip 200 has a body 298 (comprising the ramp surface 204 and catch surface 210) and a stop member 290 projecting from a side of the body 298. Each passageway 240 has a first portion 256 inward of the stop member 290 of the mounting clip 200 when the mounting clip 200 is in the advanced position. When the mounting clip 200 is in the advanced position, the stop member 290 is clear of the first portion 256 of the passageway 240. When the clip 200 is in the retracted position, the stop member 290 extends into the first portion 256 of the passageway for occlusion thereof to inhibit insertion of the cover protrusion 254 therein. The first portion 256 of the passageway 240 is aligned with the open exterior end 302 of the passageway 240 such that a respective cover protrusion 254 is insertable into the first portion 256 through the exterior end 302 for mounting the cover 250 to the housing 102.

Figure 24:
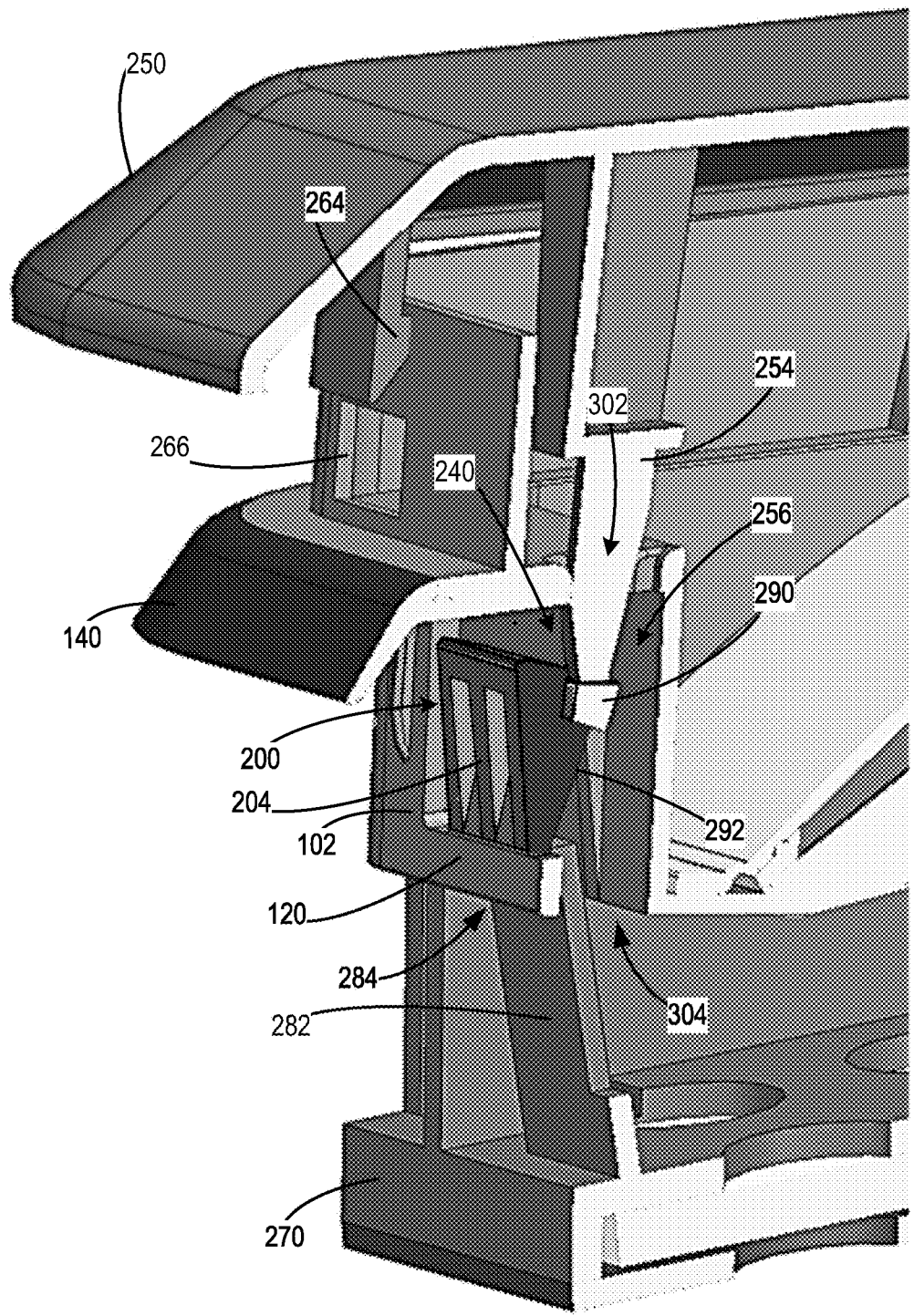

Referring to FIG. 24, in the example illustrated, one of the clips 200 is shown in the retracted position and obstructing a respective passageway 240 to inhibit mounting of the cover 250 via interference between the stop member 290 and the cover protrusion 254. This can help reveal incomplete insertion of the housing 102 into the panel aperture 104. In the example illustrated, the stop member 290 of the clip 200 blocks the first portion 256 of the passageway 240 sufficiently to resist and/or inhibit movement of the protrusion 254 through the first portion 256 of the passageway 240 and inhibit complete insertion of the cover protrusion 254 required for complete snap-fit engagement between the cover 250 and the housing 102.

Figure 15:
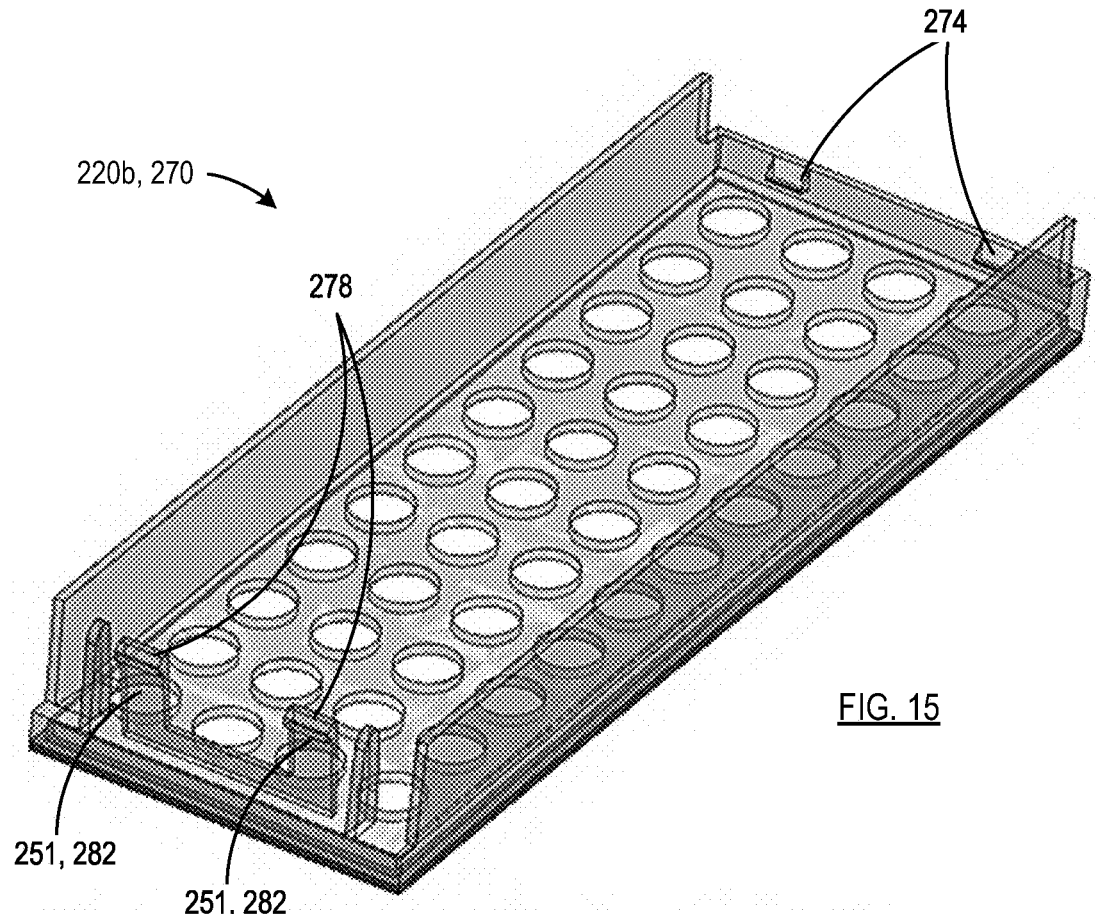
FIG. 15 is a perspective view of another second part in the form of a filter casing of the accessory apparatus of FIG. 1.
Figure 16:
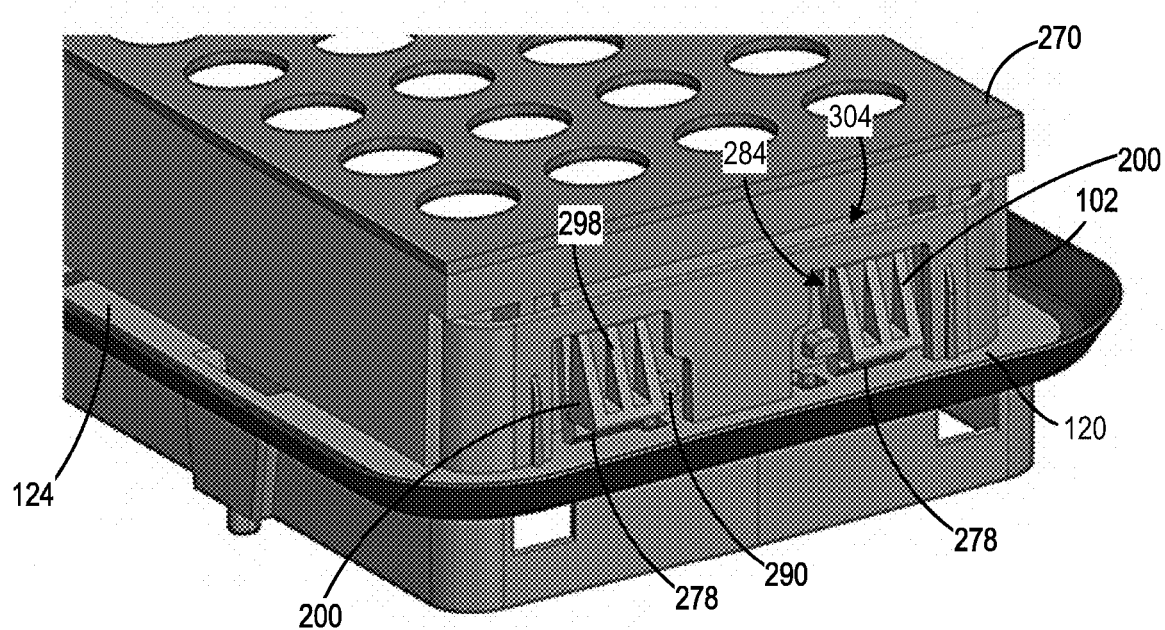
FIG. 16 is an enlarged view from the interior side of a portion of the accessory apparatus of FIG. 1 with the filter casing mounted.
Figure 20:
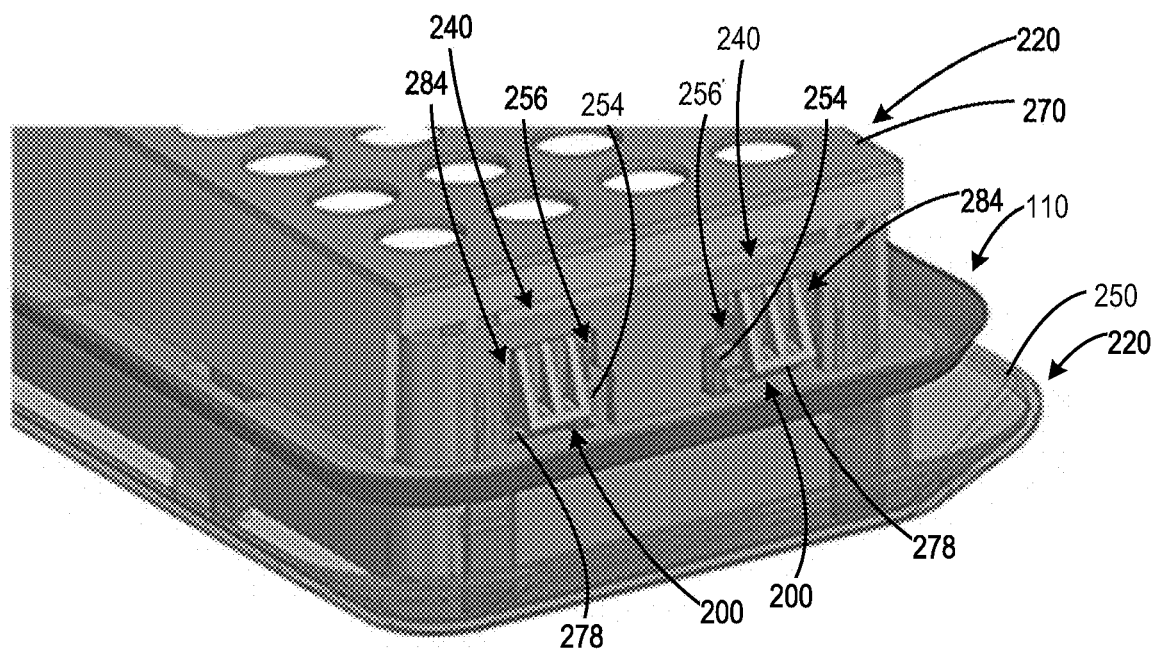
FIG. 20 is an enlarged view from the interior side of a portion of the accessory apparatus of FIG. 1, with the cover and the filter casing mounted.
Figure 21:
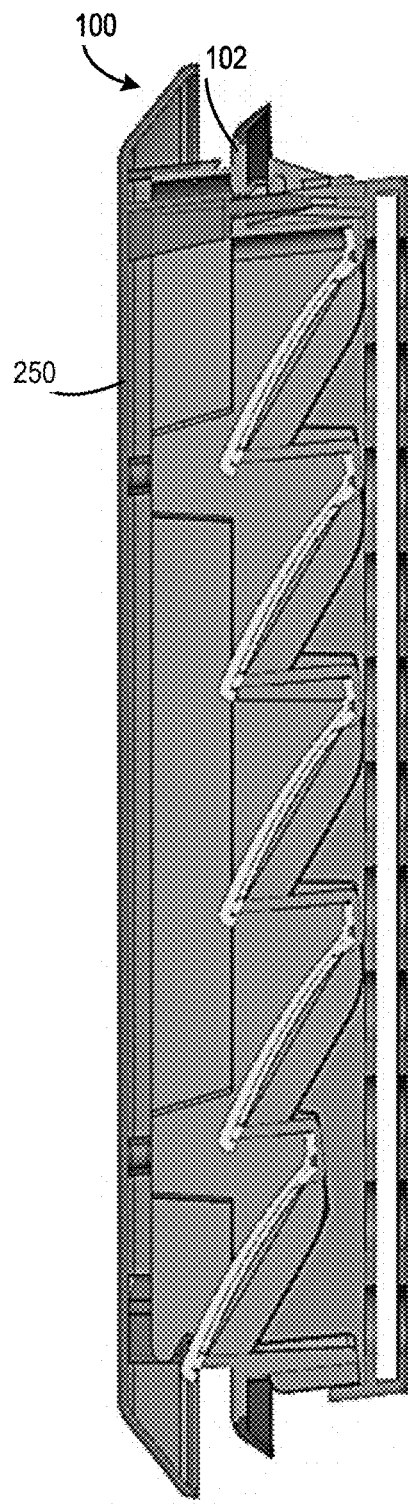
FIG. 21 is a cross-sectional view of the accessory apparatus of FIG. 1 with the cover and the filter casing mounted.
Figure 22:
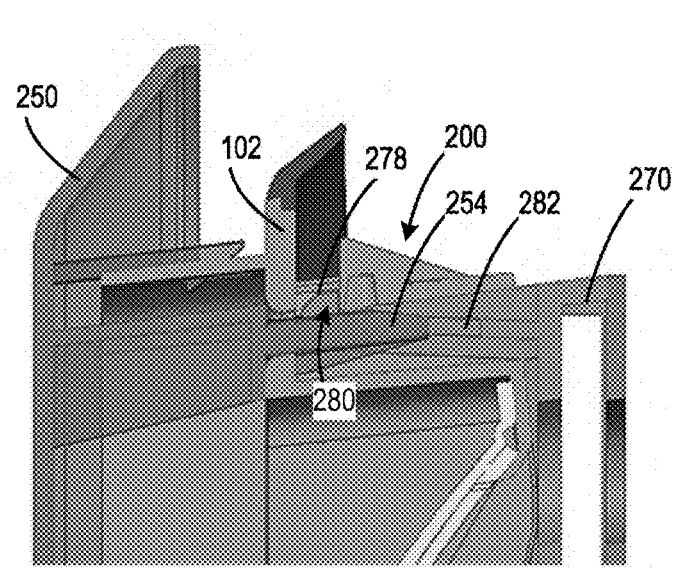
FIG. 22 is an enlarged view of an upper portion of the cross-sectional view of FIG. 21.
Figure 23:
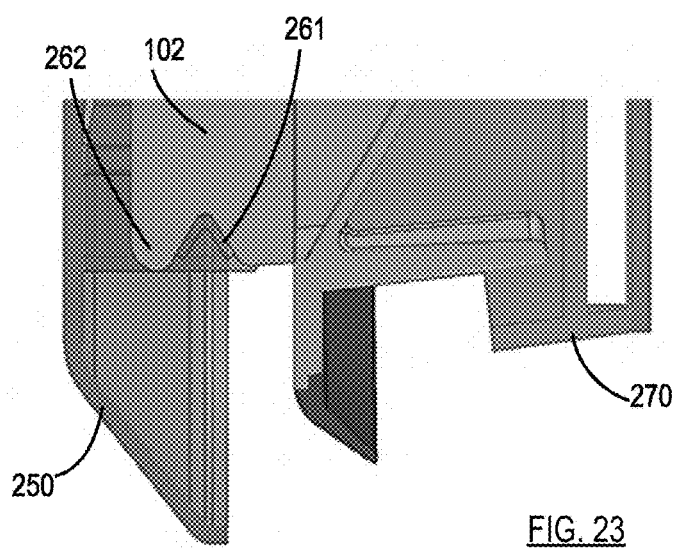
FIG. 23 is an enlarged view of a lower portion of the cross-sectional view of FIG. 21; and, FIG. 24 is a perspective cross-sectional view of the accessory apparatus of FIG. 1 with the clip portion shown in the retracted position and obstructing a passageway to inhibit mounting of the cover and the filter casing.

Referring to FIGS. 15 and 16, in the example illustrated, the other second part 220b comprises a filter casing 270 mountable over the interior face 114 of the first part 110. In the example illustrated, the filter casing 270 is for supporting a filter across the plurality of flow openings 116. In the example illustrated, the filter casing 270 has one or more filter fasteners for holding the filter casing 270 to the housing 102. In the example illustrated, the filter fasteners include filter detent connectors 274 for engagement with corresponding housing detent connectors 276. In the example illustrated, the filter fasteners further include filter snap-fit connectors 278 for engagement with corresponding housing snap-fit connectors 280. In the example illustrated, housing snap-fit connectors 280 are on a frame member opposite that on which the housing detent connectors 276 are formed. In the example illustrated, the housing snap-fit connectors 280 are on the upper frame member 120 and the housing detent connectors 276 are on the lower frame member 122. In the example illustrated, each housing snap-fit connector 280 comprises a pocket bounded by the distal end of the mounting clip 200, and the filter snap-fit connector 278 engages the distal end of the mounting clip 200 when received in the pocket for snap-fit engagement. When the mounting clip 200 is in the retracted position, the pocket is blocked from receiving the filter snap-fit connector 278.

In the example illustrated, the protrusions 251 of the filter casing 270 comprise a plurality of filter protrusions 282 directed towards the frame 108. In the example illustrated, the filter snap-fit connectors 278 comprise the filter protrusions 282.

In the example illustrated, each passageway 240 has a second portion 284 inward of and adjacent to the body 298 of the clip 200. The second portion 284 of each passageway 240 is aligned with the interior end 304 of the passageway 240 open to the interior face 114 such that the filter protrusion 282 is insertable into the second portion 284 of the passageway 240 through the open interior end 304. Each filter protrusion 282 is aligned with the second portion 284 of a respective passageway 240 for insertion therein when mounting the filter casing 270 with the clips 200 in the advanced position.

Referring to FIG. 24, in the example illustrated, when each clip 200 is in the retracted position, the clips 200 inhibit mounting of the filter casing 270 via interference between the body 298 of each clip 200 and respective filter protrusions 282. This can also help reveal incomplete insertion of the housing 102 into the panel aperture 104. In the example illustrated, when the clip 200 is in the retracted position, the body 298 of the clip 200 blocks the second portion 284 of the passageway 240 sufficiently to resist and/or inhibit movement of the protrusion 282 through the second portion 284 of the passageway 240 and inhibit complete insertion of the filter protrusion 282 required for snap-fit engagement between the filter casing 270 and the housing 102. In the example illustrated, when the clip 200 is in the retracted position, an underside surface 292 (FIG. 6) of the body 298 of the clip 200 extends into the second portion 284 of the passageway 240 for engagement with the filter protrusion 282 to block its full insertion. The underside surface 292 of the body 298 extends parallel with and is clear of the second portion 284 of the passageway 240 when the clip 200 is in the advanced position. In the example illustrated, the underside surface 292 of the body 298 is opposite the ramp surface 204, and extends between the living hinge 208 and the distal end of the mounting clip 200.

The invention claimed is:

1. A vehicle accessory apparatus for mounting in a panel aperture of a vehicle panel, the apparatus comprising:
   a) a first part including:
      i) an injection molded frame,
      ii) one or more mounting clips integrally molded with the frame along an outer periphery of the frame, each mounting clip biased to an advanced position, and resiliently movable inwardly to a retracted position upon partial insertion of the first part into the panel aperture and back outwardly toward the advanced position upon full insertion of the first part into the panel aperture for retaining the first part in the panel aperture;
      iii) one or more passageways in the frame, each passageway disposed inwardly of a respective clip, and each clip clear of a respective passageway when in the advanced position and occluding the respective passageway when in the retracted position; and
   b) at least one second part mountable to the first part when the first part is fully inserted into the panel aperture, each second part including one or more protrusions directed toward the frame, each protrusion alignable with a respective passageway for insertion therein when the respective clip is in the advanced position to mount the second part to the first part, and each protrusion inhibiting mounting of the second part to the first part through interference with the clip when the clip is in the retracted position, thereby indicating incomplete insertion of the first part into the panel aperture.

2. The apparatus of claim 1, wherein each second part is mountable in snap-fit engagement with the first part when the one or more mounting clips are in the advanced position, and when the one or more mounting clips are in the retracted position, interference between the one or more protrusions and respective clips inhibits the snap-fit engagement between the first and second parts.

3. The apparatus of claim 2, wherein the first part comprises at least one first snap-fit connector on the frame, and the second part comprises at least one second snap-fit connector directed towards and aligned with a respective first snap-fit connector for the snap-fit engagement between the first and second parts.

4. The apparatus of claim 3, wherein each protrusion of the second part comprises a respective second snap-fit connector.

5. The apparatus of claim 4, wherein the first snap-fit connector comprises a pocket adjacent a respective clip for receiving the second snap-fit connector when the protrusion is inserted into a respective passageway with the clip in the advanced position, and wherein the pocket is blocked from receiving the second snap-fit connector when the mounting clip is in the retracted position.

6. The apparatus of claim 1, wherein each passageway extends along a passageway axis, each protrusion extends generally parallel with the passageway axis when in alignment with the passageway, and each clip is movable generally perpendicular to the passageway axis between the retracted and advanced positions.

7. The apparatus of claim 1, wherein the first part has an exterior face and an interior face opposite the exterior face, and each passageway extends through the first part between an exterior end open to the exterior face and an interior end open to the interior face.

8. The apparatus of claim 7, wherein the at least one second part comprises a pair of second parts including one second part mountable over the exterior face of the first part with the at least one protrusion of the second part insertable into the passageway through the exterior end, and another second part mountable over the interior face of the first part with the at least one protrusion of the another second part insertable into the passageway through the interior end.

9. The apparatus of claim 1, wherein the first part includes an abutment surface for bearing against a front marginal surface of the vehicle panel adjacent the panel aperture when the first part is fully inserted therein, and each clip includes a catch surface directed toward the abutment surface for bearing against a rear marginal surface of the vehicle panel opposite the front marginal surface when the clip is in the advanced position to retain the housing when fully inserted in the panel aperture.

10. The apparatus of claim 9, wherein the abutment surface comprises an engagement surface of an outer peripheral seal extending about the outer periphery of the frame, the seal resiliently compressible against the front marginal surface when the housing is partially inserted into the panel aperture and the one or more clips are urged to the retracted position, and the seal remaining compressed to exert a sealing force against the vehicle panel when the one or more clips are in the advanced position for retaining the housing when fully inserted.

11. The apparatus of claim 1, wherein the frame is generally rectangular and has four frame edges including a horizontal first frame edge, a horizontal second frame edge opposite the horizontal first frame edge, a vertical third frame edge extending between the first and second frame edges, and a vertical fourth frame edge opposite the third frame edge and extending between the first and second frame edges, and wherein the one or more mounting clips are along one of the four frame edges.

12. The apparatus of claim 11, wherein the frame includes a fixed slot in another one of the four frame edges opposite the one or more mounting clips, the fixed slot for receiving a marginal portion of the vehicle panel at an edge of the panel aperture.

13. The apparatus of claim 1, wherein each clip is pivotable about a clip living hinge for movement between the advanced and the retracted positions.

14. The apparatus of claim 1, wherein the frame has an exterior face directed away from the panel aperture, an interior face opposite the interior face, and at least one flow opening extending between the exterior face and the interior face.

15. The apparatus of claim 14, wherein the first part further includes at least one injection molded flap joined to the frame adjacent an upper edge of a respective flow opening, each flap pivotable between a closed position in which the flap seals the respective flow opening, and an open position in which the flow opening is unblocked for permitting pressurized air at the interior face of the frame to vent through the respective flow opening.

16. The apparatus of claim 15, wherein the second part comprises a cover mountable over the exterior face of the frame to cover the at least one flap.

17. The apparatus of claim 15, wherein the second part comprises a filter casing mountable over the interior face of the frame for holding a filter across the at least one flow opening.

18. A vehicle accessory apparatus for mounting in a panel aperture of a vehicle panel, the apparatus comprising:
 a) a first part mountable in the panel aperture, the first part including a frame and at least one interference member attached to the frame, the interference member biased toward a first position, resiliently movable into a second position when the first part is partially inserted into the panel aperture, and returning back toward the first position when the first part is fully inserted into the panel aperture; and
 b) at least one second part mountable to the first part when the first part is fully inserted into the panel aperture with the interference member in the first position, and when the interference member is in the second position, the interference member is positioned to interfere with mounting of the second part to the first part.

19. The vehicle accessory apparatus of claim 18, wherein the frame has a respective channel adjacent each interference member, the interference member clear of the channel when in the first position and occluding the channel when in the second position, and wherein each second part includes a respective protrusion insertable into each channel when the interference member is in the first position to mount the second part to the first part, and the protrusion inhibiting mounting of the second part to the first part through interference with the interference member when the interference member is in the second position.

* * * * *